(12) United States Patent
Chaudhry et al.

(10) Patent No.: US 7,677,868 B2
(45) Date of Patent: Mar. 16, 2010

(54) SELF-LUBRICATED ACTUATOR FOR ON-BLADE ROTOR CONTROL

(75) Inventors: Zaffir Chaudhry, South Glastonbury, CT (US); Andrew John Collins, Weston SuperMare (GB); Ulf J Jonsson, South Windsor, CT (US); Fanping Sun, Glastonbury, CT (US); Brian E Wake, South Glastonbury, CT (US); Michael G O'Callaghan, Manchester, CT (US); Jimmy Lin-Min Yeh, West Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 540 days.

(21) Appl. No.: 11/567,773

(22) Filed: Dec. 7, 2006

(65) Prior Publication Data

US 2008/0138203 A1 Jun. 12, 2008

(51) Int. Cl.
*F03B 3/12* (2006.01)
(52) U.S. Cl. .............................. 416/23; 310/80; 310/54; 310/83; 310/90
(58) Field of Classification Search .................. 416/23, 416/24, 66; 310/80, 12, 54, 83, 89, 90, 49 R
See application file for complete search history.

(56) References Cited

U.S. PATENT DOCUMENTS

| 4,500,805 | A | * | 2/1985 | Swanson | 310/80 |
| 4,858,481 | A | | 8/1989 | Abraham | |
| 5,041,748 | A | | 8/1991 | Huber | |
| 5,069,076 | A | | 12/1991 | Rosenthal | |
| 5,347,083 | A | * | 9/1994 | Suzuki et al. | 84/613 |
| 5,639,215 | A | | 6/1997 | Yamakawa et al. | |
| 6,109,870 | A | | 8/2000 | Yamakawa et al. | |
| 6,960,850 | B2 | * | 11/2005 | Hashimoto et al. | 310/45 |

OTHER PUBLICATIONS

International Search Report and Written Opinion dated Oct. 10, 2008.

* cited by examiner

*Primary Examiner*—Edward Look
*Assistant Examiner*—Dwayne J White
(74) *Attorney, Agent, or Firm*—Carlson, Gaskey & Olds PC

(57) ABSTRACT

A self-lubricated actuator for a rotor blade flap of a helicopter having a housing; a motor having a shaft disposed in a bearing is provided. The actuator further has an output rod and a mechanism operatively associated with the motor and the output rod to transmit movement from the motor to the output rod. The housing includes a lubrication medium capable of substantially immersing the bearing, the motor shaft and the mechanism during operation.

24 Claims, 6 Drawing Sheets

SELF-LUBRICATED ACTUATOR FOR ON-BLADE ROTOR CONTROL

CROSS REFERENCE TO RELATED APPLICATION

This application is related to U.S. patent application Ser. No. 11/299,158, filed on Dec. 9, 2005 and U.S. patent application Ser. No. 11/299,159 filed on Dec. 9, 2005, the contents of both of which are incorporated in their entirety by reference herein.

BACKGROUND OF THE INVENTION

1. Field of the Invention

The present disclosure relates to an actuator for a rotor blade of a helicopter. More particularly, the present disclosure relates to a self-lubricated actuator for on-blade rotor control.

2. Description of Prior Art

The performance of a helicopter in the military is highly critical during combat situations and training missions. The operation and performance of particularly, the rotor blades of the helicopter is significant to the overall operation of the helicopter. The effective operation and performance of the rotor blades is achieved by the operation of the actuators, including the motors and ball and roller screws.

Currently the moving surfaces of the actuator, as bearing surfaces, the motor shaft, and the output shaft, are lubricated using grease to minimize friction. However, due to the high g forces (typically greater than 500 g) and resulting from the centrifugal forces in the operational environment of the rotor blade, the grease migrates from these friction bearing surfaces in the actuator causing potential seizure of the bearings and other moving/contacting elements.

Therefore, there exists a need for a self-lubricated actuator for an on blade rotor controller in which critical contact surfaces are substantially immersed in an oil bath to effectively dissipate heat and provide maximum lubrication to prolonged actuator performance and rapid adjustment of the control surfaces of the leading edge flaps and trailing edge flaps of rotor blades.

SUMMARY OF THE INVENTION

An actuator for a rotor controller having a housing, a motor and an output shaft operatively the motor is provided. The housing is substantially filled with lubricating oil.

An actuator for a rotor controller that will not seize under an operating environment of at least 500 g during extended flight operations is also provided.

An actuator that is fully sealed at one end to prevent oil from leaking from the actuator during exposure to 500 g centrifugal force during operation is also provided.

An actuator that dissipates heat from its contacting parts to the outside of its housing is provided.

An actuator that conducts heat from local hot spots during operation by substantial immersion in an oil bath is provided.

A brushless direct current (BLDC) motor based self-lubricated actuator that is capable of repeatedly adjusting the pitch of the rotor blades of a helicopter several times, for example $2p$-$5p$, during a single rotation of the rotor of a helicopter without seizure due to friction of contacting parts is provided.

These and other objects and advantages of the present disclosure are achieved by a self-lubricated actuator for a rotor blade trailing edge flap of a helicopter having a housing and a BLDC motor disposed within the housing. The actuator further has a motor having a shaft disposed in a bearing and an output rod. A mechanism operatively associated with the motor and the output rod transmits movement from the motor to the output rod. The housing includes a lubrication medium capable of substantially immersing the bearing, the motor shaft and the mechanism during operation.

DETAILED DESCRIPTION OF THE INVENTION

Figure 1:
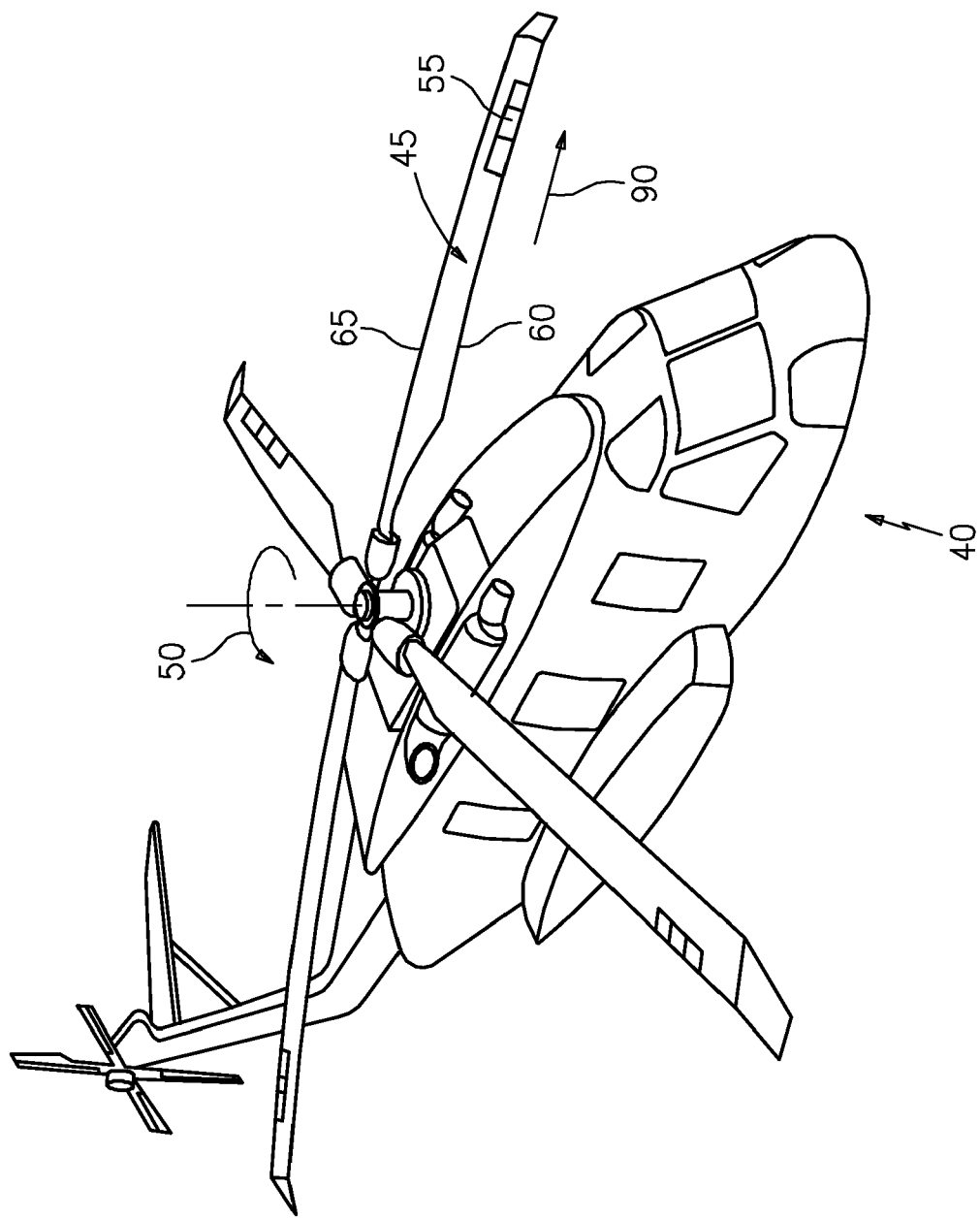
FIG. 1 illustrates a perspective view of the rotor blades of a helicopter having trailing edge flaps controlled by respective BLDC motor based self-lubricated actuators of the present disclosure.

For the purpose of promoting an understanding of the principles of the present disclosure, reference will now be made to exemplary, non-limiting embodiments. Referring to the drawings and in particular to FIG. 1, there is illustrated a helicopter 40 having one or more rotor blades 45 configured for rotation in a rotor direction 50. Each rotor blade 45 has one or more control flaps 55 (three shown) disposed thereon.

In the illustrated embodiment, control flaps 55 are disposed on a trailing edge 60 of the blade. As used herein, the trailing edge 60 is the edge of the blade that follows or trails the movement of the rotor blade 45 as the blade is rotated in the rotor direction 50. Of course, it is contemplated by the present disclosure for control flaps 55 to be disposed on a leading edge 65 of the rotor blade 45. Additionally, it is contemplated by the present disclosure for control flaps 55 to be disposed on any combination of the trailing and leading edges 60, 65, respectively.

In accordance with the principles of the present disclosure, the pitch of each control flap 55 is preferably controlled by a motor based actuator 70 (FIGS. 2 and 3) on board each blade 45. In this manner and when used on the trailing edge 60, control flaps 55 can be used to replace the swashplate of the prior art. Further, and when used on the leading edge 65, control flaps 55 can be used to impart enhanced performance by delaying retreating blade stall.

Figure 2:
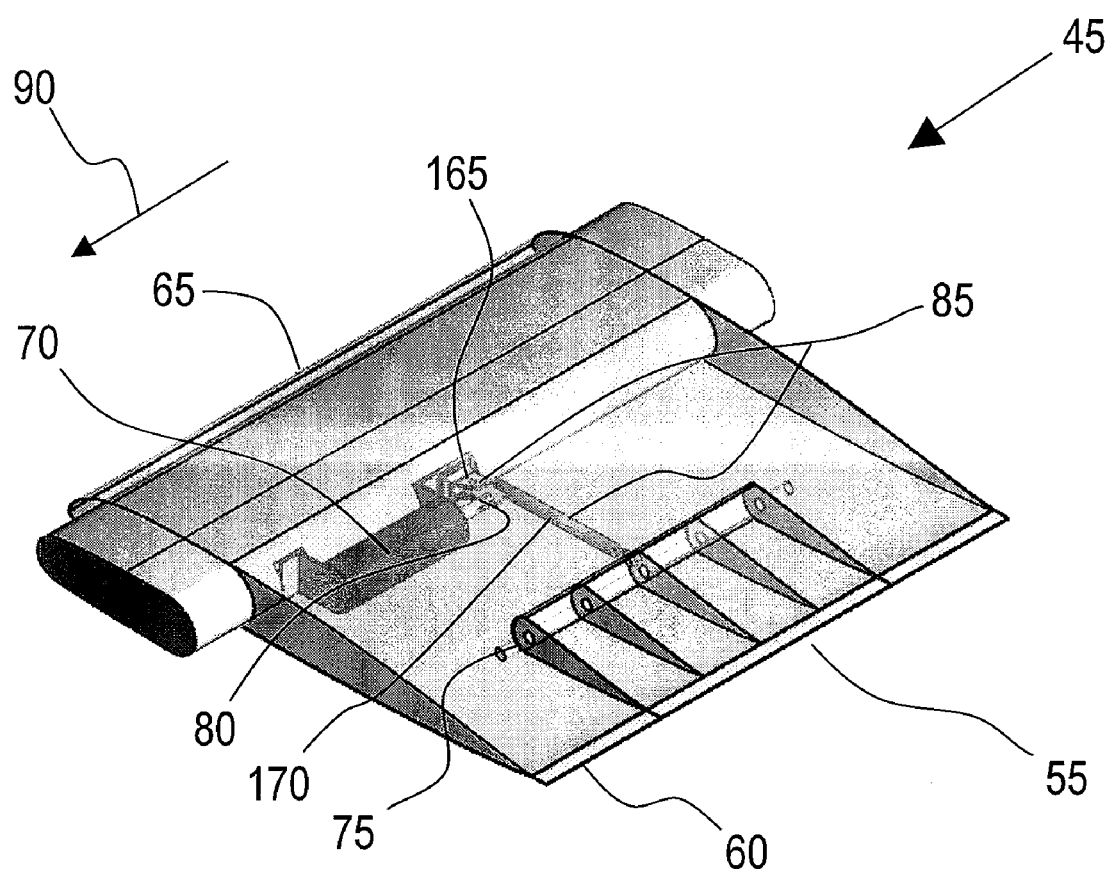
FIG. 2 illustrates a perspective view of a first embodiment of the self-lubricated actuator of the present disclosure, onboard a rotor blade in a radial direction.
Figure 3:
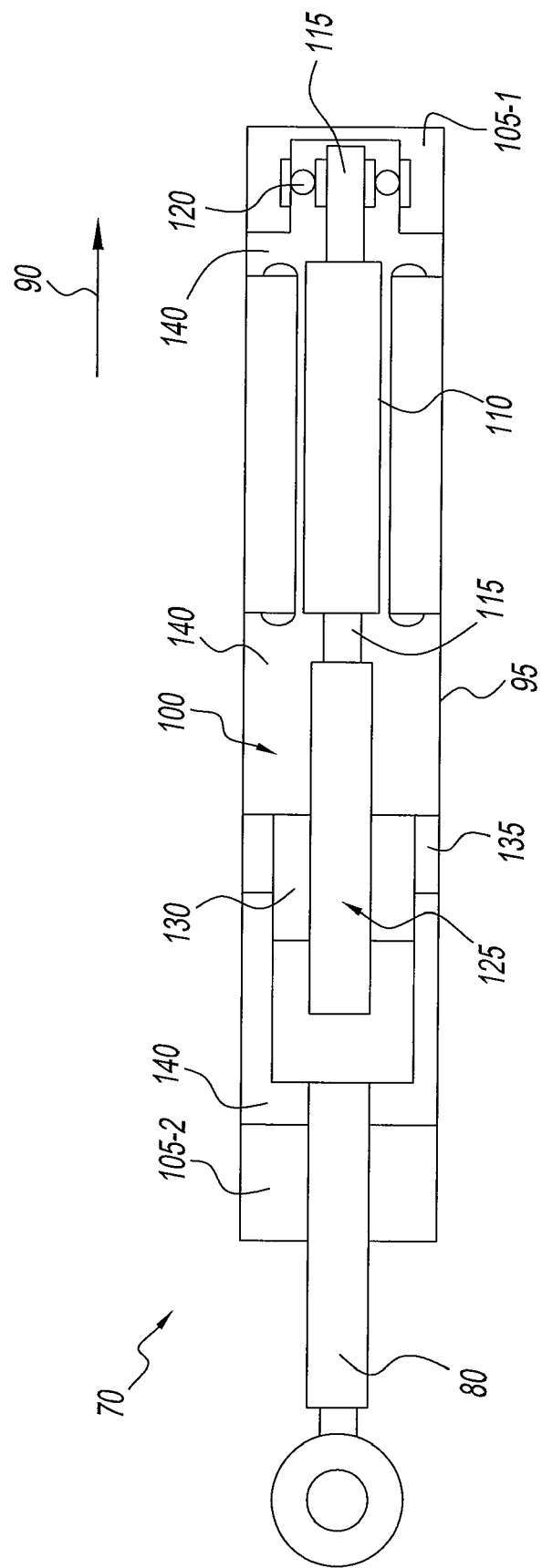
FIG. 3 illustrates a cross section of the self-lubricated actuator of FIG. 2, using a linear roller screw.

As shown in FIGS. 2 and 3, a first embodiment of a self-lubricated actuator 70 according to the present disclosure is shown. Actuator 70 is placed onboard rotor blade 45 and is configured to rotate control flap 55, illustrated for purposes of example only on trailing edge 60, about a shaft 75. Actuator 70 includes an output rod 80 connected to control flap 55 via a first transmission part 85. Actuator 70 is configured to extend and retract output rod 80 from the actuator in a linear direction that is parallel of to a radial direction 90 of rotor blade 45. The radial direction 90 is defined as the direction that is generally parallel to the length of the rotor blade 45.

First transmission part 85 is configured to convert the linear extension and retraction movement of output rod 80 into a positive or negative rotational movement of control flap 55 around shaft 75 so that the control flap can selectively change the pitch of rotor blade 45. In the illustrated embodiment, first transmission part 85 includes a crank 165 and a link 170.

Referring now to FIG. 3, actuator 70 has an outer housing 95 that encloses an internal cavity or oil reservoir 100. Outer housing 95 includes a first seal 105-1 at a first end and a second seal 105-2 at a second end to maintain the oil reservoir 100 substantially sealed. First seal 105-1 is a fixed seal, while second seal 105-2 is a sliding seal that allows output rod 80 to extend and retract.

Housing 95 includes a brushless permanent magnet motor 110 having a shaft 115 that is free to rotate within bearing 120, which is positioned proximate to the seal 105 at the first end. Housing 95 also includes a second transmission device 125 operatively connected to output rod 80, where the second transmission device 125 is configured to convert a rotary movement of motor shaft 115 into the linear movement of the output rod in the direction parallel to the radial direction 90. In the illustrated embodiment, second transmission device 125 is a linear roller screw having a receiving component 130 and an outer screw block 135. Output rod 80 is preferably made from tungsten carbide or other similarly metallic material for long performance.

Housing 95 includes a volume of oil 140 that is sufficient to substantially fill internal cavity 100. In this manner, the effect of centrifugal forces on oil 140 can be mitigated. For example, since internal cavity 100 is substantially full of oil 140, the internal components of actuator 70 will remain substantially immersed in the oil even during high centrifugal force, which would tend to move the oil within the cavity in the direction of the centrifugal force. In the embodiment illustrated in FIG. 3, the centrifugal force is along the radial direction 90 and is directed towards bearing 120. Accordingly, actuator 70, being substantially full of oil 140, is configured to maintain bearing 120, second transmission device 125, and motor 110 substantially immersed and, thus, lubricated by, oil 140. Moreover, since the centrifugal force is along the radial direction 90, the forces on oil 140 urge the oil towards first seal 105-1 and away from second seal 105-2, which assists in preventing leakage of the oil between the second seal and output rod 80.

In traditional actuators, the internal components would be individually greased for lubrication. However, rotor blade 45, during rotation in rotation direction 50 can impart a centrifugal force on the grease of at least about 200 g's and typically in excess of 500 g's, which has been determined by the present disclosure to be sufficient to force the grease of prior art actuators away from the critical contact surfaces of the actuator, thereby exposing the internal components to potential seizure.

Actuator 70 advantageously avoids this common problem. By sealing housing 95 and substantially filling the internal cavity 100 of the housing with oil 140, it has been determined by the present disclosure that all critical moving parts within housing 95 can be lubricated even during the high centrifugal force imparted on the actuator 70. In other words, there is a sufficient volume of oil 140 in internal cavity 100 so that, even when exposed to the centrifugal force, the oil still substantially immerses the internal components of actuator 70 (e.g., bearing 120, motor 110, second transmission device 125). By maintaining the internal components of actuator 70 substantially immersed in oil 140, even during high centrifugal forces, actuator 70 is advantageously configured to ensure a substantially friction free operational environment.

In use, the oil 140 in actuator 70 moves from a first position when the rotor blade 45 is in a non-operational state to a second position when the rotor blade is in an operational state (i.e., application of centrifugal force). Advantageously, the internal components of actuator 70 remain substantially immersed in oil 140, even when the oil is in the second position.

In addition to lubricating the internal moving components of actuator 70, oil 140 also operates as a medium of heat transfer. Oil 140 substantially immerses the contact surfaces of the bearing 120 and second transmission device 125 that experience friction during operation of motor 110. Significantly, oil 140 transports heat away from motor 110 and the contact surfaces towards housing 95. Such heat transfer permits a substantial amount of power to be extracted from motor for rapid flap control. The viscous nature of oil 140 permits heat transport away from high friction sites towards the cooler parts of housing 95, still substantially immersed in the oil. Further, oil 140 transports the heat towards housing 95 to be dissipated outside of actuator 70.

In contrast, a traditional grease lubricant is not capable of acting as an effective heat transport medium. Grease that is localized at a site of friction, only operates to lubricate that site for a limited amount of time and is not capable to dissipating generated heat to other areas within the housing or external to the housing. Further, the grease itself is not an effective medium to dissipate heat.

It should be recognized that second transmission device 125 is described herein above by way of example as only including a linear roller screw. Of course, it is contemplated by the present disclosure for second transmission device 125 include any components capable of converting the rotary movement of motor shaft 115 into the linear movement of the output rod 80 along the radial direction 90.

Figure 4:
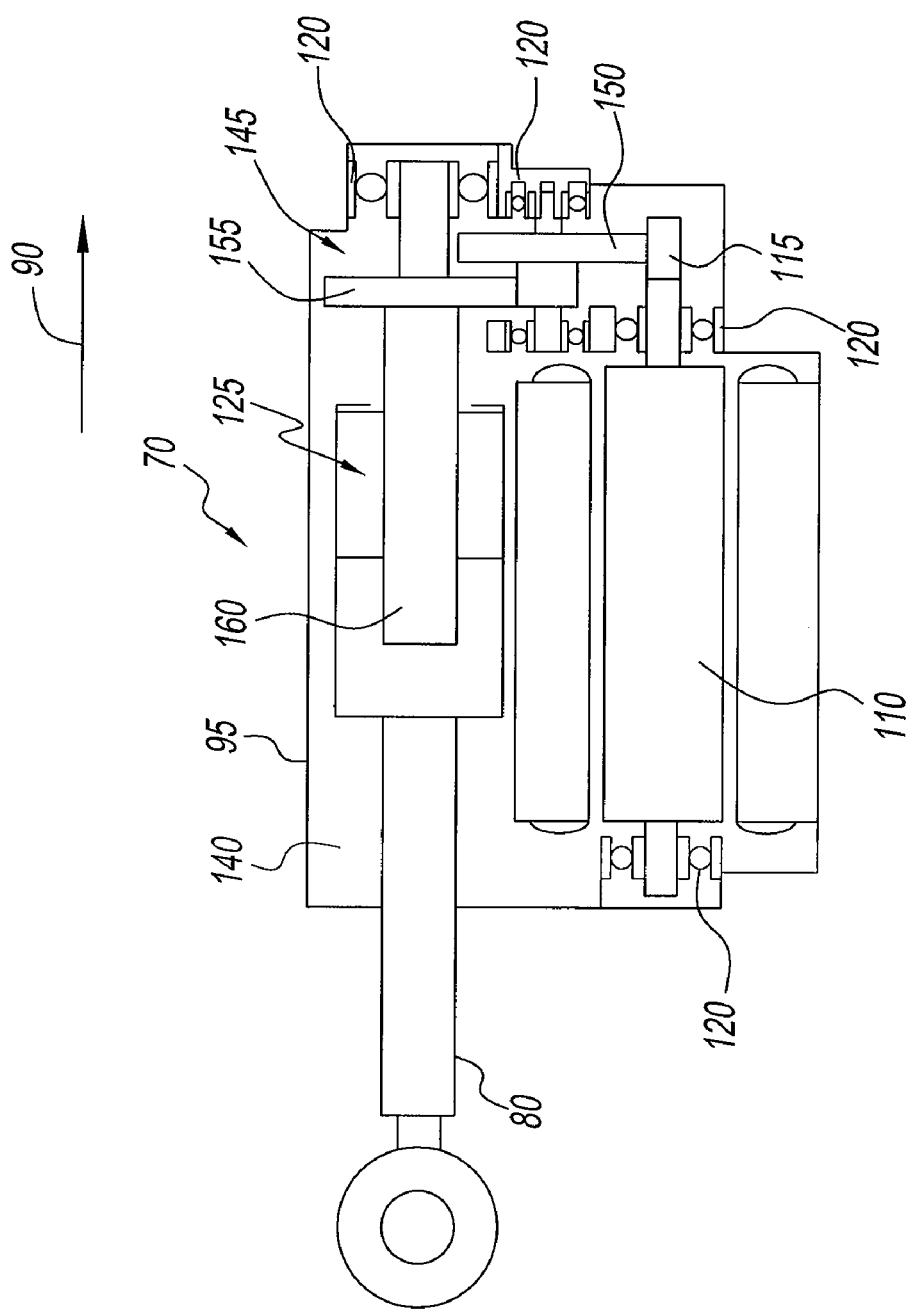
FIG. 4 illustrates an alternate embodiment of the self-lubricated actuator of the present disclosure having a two stage spur gear.
Figure 5:
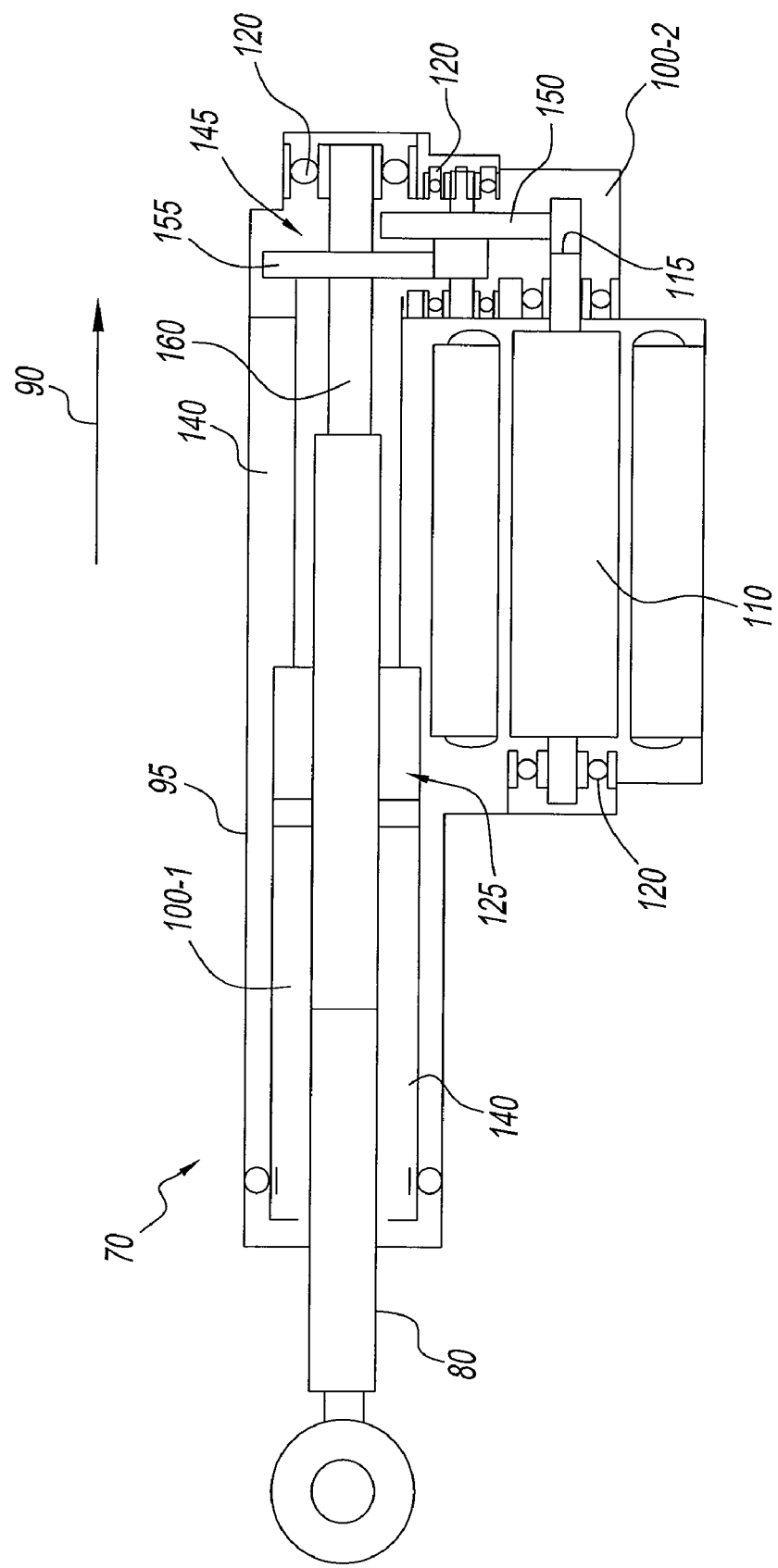
FIG. 5 illustrates an alternate embodiment of the self-lubricated actuator of FIG. 4 having two oil reservoirs.

Alternate exemplary embodiments of second transmission device 125 for actuator 70 are illustrated in FIGS. 4 and 5. In each embodiment, actuator 70 includes second transmission 125 that further includes a two-stage spur gear 145. Specifically, two stage spur gear 145 includes a first gear 150, which is driven by motor shaft 115, and a second gear 155, which is driven by the first gear 150. Further, spur gear 145 includes an output shaft 160, which is driven by the second gear 155. Output shaft 160 is operatively connected to output rod 80 via the second transmission device 125, which is configured to convert a rotary movement of output shaft 160 into the linear movement of the output rod 80 in a direction parallel to the radial direction 90. In each embodiment, actuator 70 includes a plurality of bearings 120 supporting the various gears and shafts.

Advantageously, two stage spur gear system 145 can reduce the overall length (as measured along the radial direction 90 of FIG. 2). Here, brushless permanent magnet motor 110 and output rod 80 are parallel to one another inside housing 95.

In the embodiment of FIG. 4, housing 95 defines a single oil reservoir 100, which includes a volume of oil 140 that is sufficient to substantially fill internal cavity 100. Accordingly, actuator 70, being substantially full of oil 140, is configured to maintain bearings 120, second transmission device 125, gear system 145, and motor 110 substantially immersed and, thus, lubricated by, oil 140 regardless of the application of centrifugal force on the actuator. Further, oil 140 can dissipate heat through the oil in to housing 95.

In the embodiment of FIG. 5, housing 95 defines a two oil reservoirs 100-1 and 100-2, which each includes a volume of oil 140 that is sufficient to substantially fill the particular internal cavity 100. Accordingly, actuator 70, being substantially full of oil 140, is configured to maintain bearings 120, second transmission device 125, gear system 145, and motor 110 substantially immersed and, thus, lubricated by, oil 140 regardless of the application of centrifugal force on the actuator. Further, oil 140 can dissipate heat through the oil in to housing 95.

In the illustrated embodiment, one reservoir 100-1 is defined at second transmission device 125, while the second reservoir 100-2 is defined at gear system 145. In this manner, less oil 140 is required so that the weight of actuator 70 can be minimized. Further, this embodiment allows the use of separate oils 140 for the different component of the actuator.

In the embodiment illustrated in FIG. 2, actuator 70 is configured mounted on board rotor blade 45 in the radial direction 90 so that output rod 80 moves in a direction parallel to the radial direction to rotate control flap 55 about shaft 75. Of course, it is contemplated by the present disclosure for the actuator 70 to be mounted onboard rotor blade 45 in any desired manner.

Figure 6:
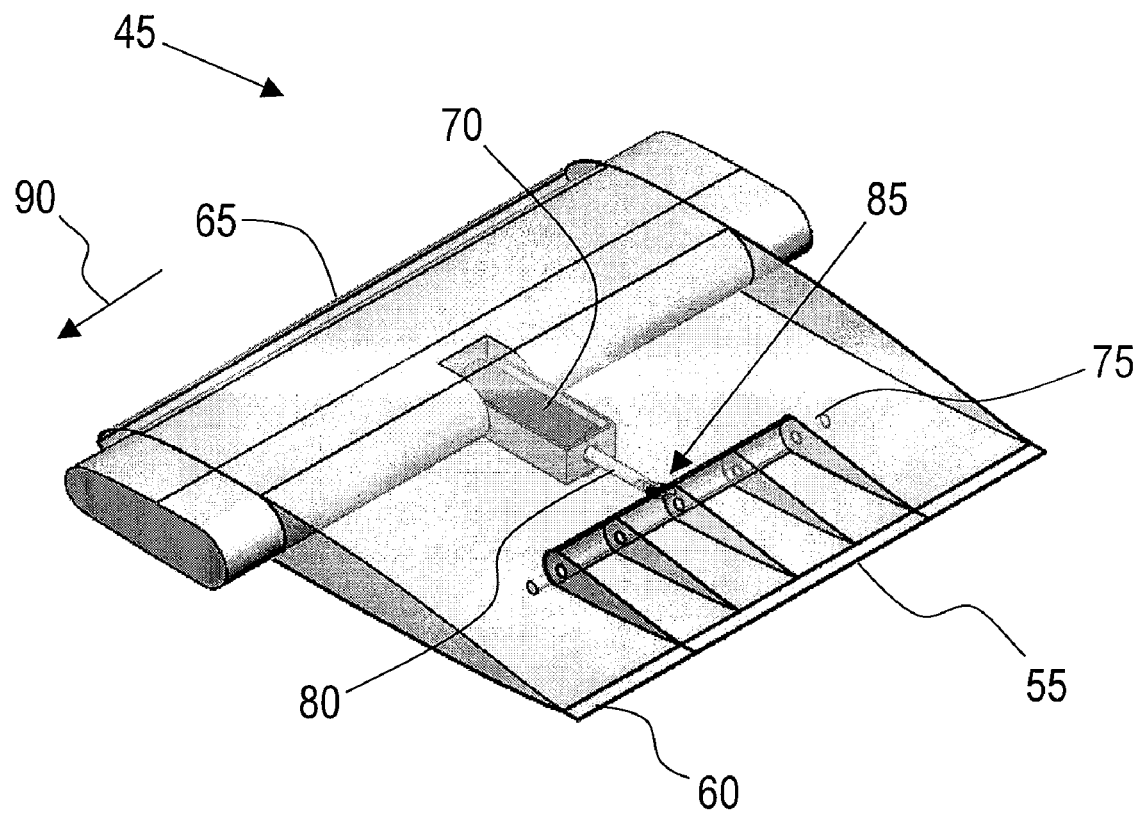
FIG. 6 illustrates a perspective view of a configuration of the self-lubricated actuator of the present disclosure, onboard a rotor blade in a chordwise direction.

For example, actuator 70 is illustrated in FIG. 6, mounted onboard rotor blade 45 in a chordwise direction, namely perpendicular to radial direction 90. The chordwise direction is defined as the direction generally between the leading edge 65 and the trailing edge 60 of the rotor blade 45. In this embodiment, actuator 70 is configured to extend and retract output rod 80 from the actuator in the chordwise direction. Again, first transmission part 85 is configured to convert the linear extension and retraction movement of output rod 80 into a positive or negative rotational movement of control flap 55 around shaft 75 so that the control flap can selectively change the pitch of rotor blade 45. Further, actuator 70 has a sufficient volume of oil 140 in the one or more internal cavities 100 so that, even when exposed to the centrifugal force, the oil still substantially immerses the internal components of actuator 70 (e.g., bearing 120, motor 110, second transmission device 125, and, when present, spur gear 145). By maintaining the internal components of actuator 70 substantially immersed in oil 140, even during high centrifugal forces, actuator 70 is advantageously configured to ensure a substantially friction free operational environment.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. A self-lubricated actuator for a control flap of a helicopter rotor blade, comprising:
    a housing defining an internal cavity;
    a motor disposed within said internal cavity for rotation of a motor shaft within said internal cavity;
    an output rod which extends from said internal cavity, said output rod extends from said housing; and
    a transmission device operatively associated with said motor shaft to convert rotation of said motor shaft into a linear movement of said output rod to extend and retract said output rod with respect to said actuator housing, said output rod extends at least partially within said internal cavity wherein said internal cavity contains a volume of lubrication medium sufficient to substantially immerse said motor shaft, said transmission device and said output rod which is at least partially within said internal cavity.

2. The actuator according to claim 1, wherein said lubrication medium is oil.

3. The actuator according to claim 1, wherein said housing further comprises a seal disposed proximate said motor shaft, said seal being capable of sealing said lubrication medium in said housing.

4. The actuator according to claim 1, wherein said transmission device comprises a linear ball screw.

5. The actuator according to claim 1, wherein said lubrication medium is movable within said internal cavity from a first position to a second position upon application of the centrifugal force.

6. The actuator according to claim 1, wherein said lubrication medium is sufficient to conduct heat away from said transmission device to said housing.

7. The actuator according to claim 1, further comprising one or more bearings in said internal cavity, said volume of lubrication medium being sufficient to substantially immerse said one or more bearings during exposure of the centrifugal force.

8. The actuator according to claim 1, wherein said motor, said motor shaft and said transmission device are substantially immersed in said lubrication medium in response to exposure of the actuator to a centrifugal force.

9. The actuator according to claim 8, further comprising a first seal mounted to said housing adjacent to said internal cavity wherein said centrifugal force is directed to force the lubrication medium toward said first seal.

10. The actuator according to claim 8, further comprising a first seal and a second seal mounted to said housing adjacent to said internal cavity wherein said centrifugal force is directed to force the lubrication medium toward said first seal and away from said second seal.

11. The actuator according to claim 10, wherein said second seal is adjacent to said output rod.

12. The actuator according to claim 11, wherein said second seal separates said portion of said output rod which is at least partially within said internal cavity from said portion of said output rod which extends from said internal cavity such that only said portion of said output rod which is at least partially within said internal cavity is exposed to said volume of lubrication medium and said portion of said output rod which extends from said internal cavity is not exposed to said volume of lubricating medium.

13. The actuator according to claim 1, wherein only said portion of said output rod which is at least partially within said internal cavity is exposed to said volume of lubrication medium.

14. The actuator according to claim 13, wherein said portion of said output rod which extends from said internal cavity is not exposed to said volume of lubricating medium.

15. A self-lubricated actuator for a control flap of a helicopter rotor blade, comprising:
    a housing defining an internal cavity;
    a motor disposed within and rotating a motor shaft within said internal cavity;
    an output rod extending from said housing; and
    transmission device operativity associated with said motor shaft to convert rotation of said motor shaft into a linear movement of said output rod; and
    a spur gear system disposed between said motor shaft and said transmission device;
    wherein said internal cavity comprises a volume of lubrication medium sufficient to substantially immerse said motor shaft and said transmission device during exposure of a centrifugal force to the actuator, said internal cavity comprises a first reservoir and a second reservoir, said transmission device disposed in said first reservoir and said spur gear system disposed in said second reservoir, said first and second reservoirs each comprising said volume of lubrication medium sufficient to substantially said motor shaft and said transmission device and said spur gear system, respectively, during exposure of the centrifugal force to the actuator.

16. A helicopter rotor blade comprising:
a control flap rotatable about a shaft;
an actuator configured to extend and retract an output rod;
a first transmission device between said control flap and said actuator, said first transmission device being configured to convert extension and retraction of said output rod into rotation of said control flap about said shaft, wherein the actuator comprises:
an actuator housing which defines an internal cavity;
a motor disposed within and rotating a motor shaft within said internal cavity; and
a second transmission device operatively associated with said motor shaft to cause rotation of said motor shaft to extend and retract said output rod with respect to said actuator housing, said output rod extends at least partially within said internal cavity wherein said internal cavity comprises a volume of lubrication medium sufficient to substantially immerse said motor shaft, said second transmission device and said output rod which is at least partially within said internal cavity.

17. The helicopter rotor blade according to claim 16, wherein said second transmission device comprises a linear ball screw.

18. The helicopter rotor blade according to claim 16, wherein said lubrication medium is movable within said internal cavity from a first position to a second position upon application of the centrifugal force.

19. The actuator according to claim 16, wherein said lubrication medium is sufficient to conduct heat away from second said transmission device to said housing.

20. The actuator according to claim 16, further comprising one or more bearings in said internal cavity, said volume of lubrication medium being sufficient to substantially immerse said one or more bearings during exposure of the centrifugal force.

21. A helicopter rotor blade comprising:
a leading rotor blade edge and a trailing rotor blade edge, a radial direction defined along said leading rotor blade edge and said trailing rotor blade edge;
a control flap rotatable about a shaft, said control flap has a position selected from the group consisting of said leading rotor blade edge, said trailing rotor blade edge, and any combinations thereof;
an actuator configured to extend and retract an output rod, said actuator positioned so that said output rod extends and retracts in a direction parallel to said radial direction;
a first transmission device between said control flap and said actuator, said first transmission device being configured to convert extension and retraction of said output rod into rotation of said control flap about said shaft, wherein the actuator comprises:
a housing defining an internal cavity;
a motor disposed within and rotating a motor shaft within said cavity;
a second transmission device operatively associated with said motor shaft to cause rotation of said motor shaft to extend and retract said output rod, wherein said cavity comprises a volume of lubrication medium sufficient to substantially immerse said motor shaft and said second transmission device during exposure of a centrifugal force to the actuator;
a sliding seal between said output rod and said housing so that during exposure of the centrifugal force to the actuator said lubrication medium is urged away from said sliding seal.

22. The helicopter rotor blade according to claim 21, further comprising a chordwise direction defined between said leading rotor blade edge and said trailing rotor blade edge, wherein said actuator is positioned so that said output rod extends and retracts in a direction parallel to said chordwise direction.

23. A helicopter rotor blade comprising:
a control flap rotatable about a shaft;
an actuator configured to extend and retract an output rod; and
a first transmission device between said control flap and said actuator, said first transmission device being configured to convert extension and retraction of said output rod into rotation of said control flap about said shaft, wherein the actuator comprises:
a housing defining an internal cavity;
a motor disposed within and rotating a motor shaft within said cavity;
a second transmission device operatively associated with said motor shaft to cause rotation of said motor shaft to extend and retract said output rod, wherein said cavity comprises a volume of lubrication medium sufficient to substantially immerse said motor shaft and said second transmission device during exposure of a centrifugal force to the actuator; and
a spur gear system disposed between said motor shaft and said second transmission device;
wherein said internal cavity comprises a first reservoir and a second reservoir, said second transmission device being disposed in said first reservoir and said spur gear system being disposed in said second reservoir, said first and second reservoirs each comprising said volume of lubrication medium sufficient to substantially immerse said motor shaft and said second transmission device and said spur gear system, respectively, during exposure of the centrifugal force to the actuator.

24. The helicopter rotor blade according to claim 23, wherein said internal cavity comprises a first reservoir and a second reservoir, said second transmission device being disposed in said first reservoir and said spur gear system being disposed in said second reservoir, said first and second reservoirs each comprising said volume of lubrication medium sufficient to substantially immerse said motor shaft and said second transmission device and said spur gear system, respectively, during exposure of the centrifugal force to the actuator.

* * * * *

UNITED STATES PATENT AND TRADEMARK OFFICE
CERTIFICATE OF CORRECTION

| | |
|---|---|
| PATENT NO. | : 7,677,868 B2 |
| APPLICATION NO. | : 11/567773 |
| DATED | : March 16, 2010 |
| INVENTOR(S) | : Chaudhry et al. |

Page 1 of 1

It is certified that error appears in the above-identified patent and that said Letters Patent is hereby corrected as shown below:

Claim 5, column 6, line 11: "the" should read as --a--

Claim 7, column 6, line 19: "the" should read as --a--

Claim 12, column 6, line 37: the first occurrence of "said" should read as --a--

Claim 13, column 6, line 45: "said" should read as --a--

Claim 18, column 7, line 34: "the" should read as --a--

Claim 20, column 7, line 41: "the" should read as --a--

Signed and Sealed this

Twenty-second Day of June, 2010

David J. Kappos
*Director of the United States Patent and Trademark Office*